US006839856B1

(12) United States Patent
Fromm et al.

(10) Patent No.: US 6,839,856 B1
(45) Date of Patent: Jan. 4, 2005

(54) METHOD AND CIRCUIT FOR RELIABLE DATA CAPTURE IN THE PRESENCE OF BUS-MASTER CHANGEOVERS

(75) Inventors: Eric C. Fromm, Eau Claire, WI (US); Rodney Ruesch, Eau Claire, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 377 days.

(21) Appl. No.: 09/620,058

(22) Filed: Jul. 20, 2000

(51) Int. Cl.[7] .............................................. G06F 13/42

(52) U.S. Cl. ...................................... 713/400; 365/220

(58) Field of Search ........................ 713/400; 375/371, 375/354; 370/503

(56) References Cited

U.S. PATENT DOCUMENTS

| | | | |
|---|---|---|---|
| 4,477,713 A | 10/1984 | Cook et al. | 219/124.34 |
| 4,514,749 A | 4/1985 | Shoji | 357/68 |
| 4,587,445 A | 5/1986 | Kanuma | 307/443 |
| 4,615,040 A * | 9/1986 | Mojoli et al. | 375/267 |
| 4,637,018 A | 1/1987 | Flora et al. | 371/1 |
| 4,696,019 A | 9/1987 | Tulpule et al. | 375/107 |
| 4,755,704 A | 7/1988 | Flora et al. | 307/269 |
| 4,805,195 A | 2/1989 | Keegan | 375/106 |
| 4,823,184 A | 4/1989 | Belmares-Sarabia et al. | 358/27 |
| 4,833,695 A | 5/1989 | Greub | 375/118 |
| 4,845,390 A | 7/1989 | Chan | 307/602 |
| 4,860,322 A | 8/1989 | Lloyd | 375/107 |
| 4,896,272 A | 1/1990 | Kurosawa | 364/491 |
| 4,926,066 A | 5/1990 | Maini et al. | 307/303.1 |
| 4,958,349 A * | 9/1990 | Tanner et al. | 714/759 |

(List continued on next page.)

FOREIGN PATENT DOCUMENTS

EP 989484 A2 * 3/2000 ............. G06F/5/06

OTHER PUBLICATIONS

IBM TDB, Synchronous Bus Architecture, Jan. 1, 1993, vol. 36 Issue 1 pp. 104–107.*

(List continued on next page.)

Primary Examiner—Thomas Lee
Assistant Examiner—Mark Connolly
(74) Attorney, Agent, or Firm—Schwegman, Lundberg, Woessner & Kluth, P.A.

(57) ABSTRACT

A bus interface circuit and method for reliable data capture in the presence of bus-master changeovers and/or for synchronizing received data to an internal clock signal, wherein the received data includes a strobe. Since the strobe may have a delay that is unknown (due to varying distances from the driver, clock jitter, and/or other causes), it is important to re-synchronize to the internal clock, and to do so with the smallest delay possible. This synchronization is provided in a way that also eliminates potential problems due to bus-master changeover, and in a way that minimizes time-critical signal generation. One aspect provides a method and/or apparatus for reliable data capture. The method includes: providing an N-stage latch including a first stage latch and a second stage latch, wherein N is two or larger; loading every Nth word of a data stream into the first stage latch using a first signal based on a strobe passed in the data stream; loading every N+1st word of the data stream into the second stage latch using a second signal based on the strobe passed in the data stream; unloading every Nth word from the first stage latch using a third signal based on an internal bus clock; and unloading every N+1st word from the second stage latch using a fourth signal based on the internal bus clock. In some embodiments, the first signal and the second signal are further based on a first stage selector and on a data_ready signal passed in the data stream.

30 Claims, 8 Drawing Sheets

U.S. PATENT DOCUMENTS

| | | | | |
|---|---|---|---|---|
| 4,959,540 A | | 9/1990 | Fan et al. | 250/227.12 |
| 5,087,829 A | | 2/1992 | Ishibashi et al. | 307/269 |
| 5,224,105 A | * | 6/1993 | Higley | 714/748 |
| 5,287,359 A | * | 2/1994 | Engelse | 370/503 |
| 5,295,132 A | | 3/1994 | Hashimoto et al. | 370/13 |
| 5,315,175 A | | 5/1994 | Langner | 307/443 |
| 5,329,188 A | | 7/1994 | Sikkink et al. | 307/517 |
| 5,394,528 A | | 2/1995 | Kobayashi et al. | 395/325 |
| 5,416,606 A | | 5/1995 | Katayama et al. | 358/467 |
| 5,481,567 A | | 1/1996 | Betts et al. | 375/261 |
| 5,490,252 A | | 2/1996 | Macera et al. | 395/200.1 |
| 5,502,733 A | | 3/1996 | Kishi et al. | 714/748 |
| 5,506,953 A | | 4/1996 | Dao | 395/166 |
| 5,521,836 A | | 5/1996 | Hartong et al. | 364/491 |
| 5,535,223 A | | 7/1996 | Horstmann et al. | 371/27 |
| 5,544,203 A | | 8/1996 | Casasanta et al. | 375/376 |
| 5,555,188 A | | 9/1996 | Chakradhar | 364/490 |
| 5,561,844 A | * | 10/1996 | Jayapalan et al. | 455/442 |
| 5,603,056 A | | 2/1997 | Totani | 395/828 |
| 5,604,450 A | | 2/1997 | Borkar et al. | 326/82 |
| 5,617,537 A | | 4/1997 | Yamada et al. | 395/200.01 |
| 5,657,346 A | | 8/1997 | Lordi et al. | 375/224 |
| 5,682,512 A | | 10/1997 | Tetrick | 395/412 |
| 5,748,547 A | | 5/1998 | Shau | 365/222 |
| 5,757,658 A | | 5/1998 | Rodman et al. | 364/491 |
| 5,778,429 A | | 7/1998 | Sukegawa et al. | 711/129 |
| 5,784,706 A | | 7/1998 | Oberlin et al. | 711/202 |
| 5,787,268 A | | 7/1998 | Sugiyama et al. | 395/500 |
| 5,793,259 A | | 8/1998 | Chengson | 331/78 |
| 5,811,997 A | | 9/1998 | Chengson et al. | 327/112 |
| 5,828,833 A | | 10/1998 | Belville et al. | 395/187.01 |
| 5,844,954 A | | 12/1998 | Casasanta et al. | 375/373 |
| 5,847,592 A | | 12/1998 | Gleim et al. | 327/403 |
| 5,850,422 A | * | 12/1998 | Chen | 375/371 |
| 5,898,729 A | | 4/1999 | Boezen et al. | 375/259 |
| 5,910,898 A | | 6/1999 | Johannsen | 364/489 |
| 5,915,104 A | | 6/1999 | Miller | 395/309 |
| 5,978,953 A | | 11/1999 | Olarig | 714/768 |
| 6,005,895 A | | 12/1999 | Perino et al. | 375/288 |
| 6,016,553 A | | 1/2000 | Schneider et al. | 714/21 |
| 6,161,169 A | * | 12/2000 | Cheng | 711/150 |
| 6,240,031 B1 | * | 5/2001 | Mehrotra et al. | 365/220 |
| 6,272,651 B1 | | 8/2001 | Chin et al. | 714/43 |
| 6,333,922 B1 | * | 12/2001 | Campanella | 370/319 |
| 6,363,502 B1 | | 3/2002 | Jeddeloh | 714/52 |
| 6,412,056 B1 | | 6/2002 | Gharachorloo et al. | 711/202 |
| 6,487,685 B1 | | 11/2002 | Stuart Fiske et al. | 714/701 |
| 6,553,421 B1 | * | 4/2003 | Frick et al. | 709/227 |

OTHER PUBLICATIONS

Accelerated Graphics Port Interface Specification Revision 2.0, May 4, 1998, Intel Corporation, pp. 52–83.*

"Low Power Quad Differential Line Driver with Cut–Off", *National Semiconductor, F100K ECL 300 Series Databook and Design Guide,* pp. 2–54—2–60, (1992).

"The SA27 library includes programmable delay elements DELAYMUXO and DELAYMUXN. How are these cells used?", *IBM Delaymuxn Book,* pp. 1–6, (Feb. 1999).

Djordjevic, A.R., et al., "Time Domain Response of Multi-conductor Transmission Lines", *Proceedings of the IEEE,* 75 (6), 743–64, (Jun. 1987).

Im, G., et al., "Bandwidth–Efficient Digital Transmission over Unshielded Twisted–Pair Wiring", *IEEE Journal on Selected Areas in Communications, 13* (9), 1643–1655, (Dec. 1995).

Mooney, R., et al., "A 900 Mb/s Bidirectional Signaling Scheme", *IEEE Journal of Solid–State Circuits, 30* (*12*), 1538–1543, (Dec. 1995).

Takahashi, T., et al., "110GB/s Simultaneous Bi–Directional Transceiver Logic Synchronized with a System Clock", *IEEE International Solid–State Circuits Conference,* 176–177, (1999).

"Dynamic Datapath Selection for Unpredictable Transger Starts", *IBM Technical Disclosure Bulletin,* TBA–AC-C–NO: NA9402589, Issue No.: 2A, Cross Reference: 0018–8689–37–2A–589,(1994),589–592.

"Dynamic Switch to Data Slow Mode on a Memory Card", *IBM Technical Disclosure Bulletin, 37,* NA9402637,(1994), 321–322.

"Memory Card Data Fastpath", *IBM Technical Disclosure Bulletin, 37,* TDB–ACC–NO: NA9402637, Issue No.: 2A, Cross Reference: 0018–8689–37–2A–637,(1994),637–638.

Brewer, Kevan, "Re: Memory mapped registers", (Online): comp.arch.embedded, (May 2, 1996).

Gjessing, et al., "Performance of the RamLink Memory Achritecture", *Proceedings HICSS'94,* (1994),154–162.

Gjessing, Stein , et al., "RamLink: A High–BandwidthPoint–to–Point Memory Architecture", *Proceeding CompCon,* (1992),328/331.

IEEE Std, "IEEE Standard for High–Bandwidth Memory Interface Based on Scalable Coherent Interface(SCI) Signaling Technology (RAMLink)", *IEEE Std 1596.4–1996,* (1996),1–91.

Rao, A. , "Memory mapped registers", new://comp.arch.ambedded, (Apr. 27, 1996).

* cited by examiner

METHOD AND CIRCUIT FOR RELIABLE DATA CAPTURE IN THE PRESENCE OF BUS-MASTER CHANGEOVERS

CROSS-REFERENCES TO RELATED INVENTIONS

The present invention is related to the following applications, which are filed on even date herewith, and which are all incorporated herein by reference:

U.S. patent application Ser. No. 07/620,504, filed Jul. 20, 2000, titled "OPTIMIZE GLOBAL NET TIMING";

U.S. patent application Ser. No. 09/619,724, filed Jul. 20, 2000, titled "I/O IMPEDANCE CONTROLLER";

U.S. patent application Ser. No. 09/620,679, filed Jul. 20, 2000, titled "GTL+DRIVER";

U.S. patent application Ser. No. 09/621,312, filed Jul. 20, 2000, titled "GTL+ONE-ONE/ZERO-ZERO DETECTOR";

U.S. patent application Ser. No. 09/619,771, filed Jul. 20, 2000, titled "DUAL-BANK FIFO FOR SYNCHRONIZATION OF READ DATA IN DDR SDRAM";

U.S. patent application Ser. No. 09/619,959, filed Jul. 20, 2000, titled "DISCRETE DELAY LINE SYSTEM AND METHOD";

U.S. patent application Ser. No. 09/620,683, filed Jul. 20, 2000, titled "SYSTEM AND METHOD FOR ACCURATE ADJUSTMENT OF DISCRETE INTEGRATED CIRCUIT DELAY LINES";

U.S. patent application Ser. No. 09/621,315, filed Jul. 20, 2000, titled "AN INTERFACE FOR SYNCHRONOUS DATA TRANSFER BETWEEN DOMAINS LOCKED AT DIFFERENT FREQUENCIES";

U.S. patent application Ser. No. 09/621,659, filed Jul. 20, 2000, titled "LATENCY-ENHANCING ERROR-CORRECTION POLICY METHOD AND APPARATUS";

U.S. patent application Ser. No. 09/620,333, filed Jul. 20, 2000, titled "VARIABLE MODE BI-DIRECTIONAL AND UNI-DIRECTIONAL COMPUTER COMMUNICATION SYSTEM";

U.S. patent application Ser. No. 09/620,372, filed Jul. 20, 2000, titled "MULTIPROCESSOR SYSTEM UTILIZING MULTIPLE LINKS TO IMPROVE POINT TO POINT BANDWIDTH";

U.S. patent application Ser. No. 09/619,851, filed Jul. 20, 2000, titled "DISTRIBUTION OF ADDRESS-TRANSLATION-PURGE REQUESTS";

U.S. patent application Ser. No. 09/619,722, filed Jul. 20, 2000, titled "METHOD AND APPARATUS FOR ACCESSING MMR REGISTERS DISTRIBUTED ACROSS A LARGE ASIC";

U.S. patent application Ser. No. 09/620,373, filed Jul. 20, 2000, titled "METHOD AND APPARATUS FOR COMMUNICATING COMPUTER DATA FROM ONE POINT TO ANOTHER OVER A COMMUNICATIONS MEDIUM";

U.S. patent application Ser. No. 09/620,336, filed Jul. 20, 2000, titled "SYSTEM AND METHOD FOR GENERATING CLOCK SIGNALS";

U.S. patent application Ser. No. 09/620,338, filed Jul. 20, 2000, titled "SYNTHESIS WITH AUTOMATED PLACEMENT INFORMATION FEEDBACK";

U.S. patent application Ser. No. 09/620,335, filed Jul. 20, 2000, titled "HEAT SINK ATTACHMENT CLIP";

U.S. patent application Ser. No. 09/619,818, filed Jul. 20, 2000, titled "BAFFLE SYSTEM FOR AIR COOLED COMPUTER ASSEMBLY";

U.S. patent application Ser. No. 09/619,725, filed Jul. 20, 2000, titled "PRINTED CIRCUIT BOARD STIFFENER";

U.S. patent application Ser. No. 09/620,178, filed Jul. 20, 2000, titled "MEMORY DAUGHTER CARD APPARATUS, CONFIGURATIONS, AND METHODS";

U.S. patent application Ser. No. 09/619,869, filed Jul. 20, 2000, titled "ASSEMBLY PROCESS AND HEAT SINK DESIGN FOR HIGH POWERED PROCESSOR"; and U.S. patent application Ser. No. 09/620,059, filed Jul. 20, 2000, titled "PRINTED CIRCUIT BOARD COMPONENT PACKAGING".

FIELD OF THE INVENTION

This invention relates to the field of computer error correction, and more specifically to a method and apparatus for reliable data capture in the presence of bus-master changeovers.

BACKGROUND OF THE INVENTION

Multiprocessor systems often include a single bus to which a plurality of processors are connected. Many such busses have a bus master (e.g., one of the processors) that controls or initiates data transfers, while the other processors or other devices on the bus are slaves. Some systems allow changes as to which device or processor is the bus master, such that the current bus master will release the bus, and a short time later, another device becomes bus master. Such computer systems include single-processor systems (using a single processor coupled on a bus to a plurality of other devices), as well as multiple-processor systems.

Some such systems include a tri-state bus (or similar bus), wherein devices connected to the bus can drive the voltage low (e.g., a data zero), drive the voltage high (e.g., a data one), or provide a high-impedance and not drive the voltage (this last state allows another device on the bus to drive the bus with its data). When a bus master releases the bus, it will stop driving the bus, and go to a high-impedance state, and the next bus master will then start to drive the bus. In between, the bus is, or can be, in an entirely high-impedance state, in which no device is driving the bus (all devices are in a high-impedance state). This can occur in the entire bus, or on just one or a small number of lines of the bus.

During periods in which one or more lines of the bus are in an undriven or high-impedance state, these lines are quite susceptible to noise, e.g., electromagnetic signals are picked up by the high-impedance lines, such that they can have a voltage that is interpreted by receivers on the line as a voltage or a clock edge. As signal frequencies increase, radiated electromagnetic signals increase, making the problem worse.

The problem is particularly problematic for clock and strobe signal lines, since receivers can misinterpret noise on such clock lines as the clock signal from the new bus master before the new bus master has had a chance to establish the data that is to be clocked, and before the new bus master has had a chance to send its own clock signal.

Very fast access to data transmitted on the bus along with reliable data transfer (with no errors) is desired to enhance the speed of the computer systems which use those busses, and at the same time, reliability and serviceability of the computer system is required. Thus, it is desirable to minimize the times during bus-master changes.

Further, when data are passed over a distance, there is a need to synchronize the data to a local clock. For example, if one or more processors are connected across a common bus to a node-interface chip, even though the processor(s) and the node-interface chip are provided a common clock signal, the data passed between them will be shifted in phase or time relative to their local copy of the common clock.

Thus, there is a need for a method and apparatus that can quickly and reliably handle bus-master changes. There is also a need for a method and apparatus that can quickly and reliably re-synchronize data to a local clock.

SUMMARY OF THE INVENTION

The present invention provides a bus interface circuit and method for reliable data capture in the presence of bus-master changeovers and/or for synchronizing received data to an internal clock signal, wherein the received data includes a strobe. Since the strobe may have a delay that is unknown (due to varying distances from the driver, clock jitter, and/or other cause), it is important to re-synchronize to the internal clock, and to do so with smallest delay possible. The present invention provides this synchronization in a way that also eliminates potential problems due to bus master changeover, and in a way that minimizes time-critical signal generation.

One aspect of the present invention provides a method for reliable data capture. The method includes: providing an N-stage latch including a first stage latch and a second stage latch, wherein N is two or larger; loading every Nth word of a data stream into the first stage latch using a first signal based on a strobe passed in the data stream; loading every N+1st word of the data stream into the second stage latch using a second signal based on the strobe passed in the data stream; unloading every Nth word from the first stage latch using a third signal based on an internal bus clock; and unloading every N+1st word torn the second stage latch using a fourth signal based on the internal bus clock.

Another aspect of the present invention provides a method for reliable data capture. This method includes providing an N-stage latch including a first stage latch and a second stage latch, wherein N is four or larger; loading every Nth word of a data stream into the first stage latch; using a first signal based on a strobe passed in the data stream; loading every N+2nd word of the data stream into the second stage latch using a second signal based on the strobe passed in the data stream; unloading every Nth word from the first stage latch using a third signal based on an internal bus clock; and unloading every N+2nd word from the second stage latch using a fourth signal based on the internal bus clock.

Another aspect of the present invention provides an improved circuit for reliable capture of data words from a data stream. The circuit includes an enable-signal circuit that provides a first signal based on a strobe passed in the data stream and a second signal based on the strobe passed in the data stream; an N-stage latch including a first stage latch and a second stage latch, wherein N is two or larger, and wherein the first signal loads every Nth word of a data stream into the first stage latch using the first signal, and second signal loads every N+1st word of the data stream into the second stage latch using the second signal; an unload-signal circuit that provides a third signal based on an internal bus clock and a fourth signal based on the internal bus clock; and a multiplexor having a data input connected to an output of the first stage latch and having another data input connected to an output of the second stage latch and a control input operatively coupled to the unload-signal circuit, wherein the multiplexor selects every Nth word from the first stage latch based on the third signal and selects every N+1st word from the second stage latch based on the fourth signal.

Yet another aspect of the present invention provides a circuit for reliable capture of data words from a data stream. This circuit includes an enable-signal circuit that provides a first signal based on a strobe passed in the data stream and a second signal based on the strobe passed in the data stream; an N-stage latch operatively coupled to the enable-signal circuit including a first stage latch and a second stage latch, wherein N is four or larger, and wherein the first stage latch loads every Nth word of a data stream based on the first signal, and the second stage latch loads every N+2nd word of the data stream based on the second signal; an unload-signal circuit that provides a third signal based on an internal bus clock and a fourth signal based on the internal bus clock; and a multiplexor having a data input connected to an output of the first stage latch and having another data input connected to an output of the second stage latch and a control input operatively coupled to the unload-signal circuit, wherein the multiplexor selects every Nth word from the first stage latch based on the third signal and selects every N+2nd word from the second stage latch based on the fourth signal.

Still another aspect of the present invention provides a multiprocessor system that includes the circuit of one or more embodiments described above, the system further including a bus, a plurality of processors each operably coupled to the bus, an interface chip operably coupled to the bus, and a memory operably coupled to the interface chip Still another aspect of the present invention provides a method for reliable data capture from a bus, the method including: providing an N-stage FIFO including a first stage and a second stage, wherein N is two or larger; loading every Nth word of a data stream into the first stage using a first signal based on a stage selector, and on a strobe and a data_ready signal passed in the data stream; loading every N+1st word of the data stream into the second stage latch using a second signal based on the stage selector, and on the strobe and the data_ready signal passed in the data stream; unloading every Nth word from the first stage using a third signal based on a local clock and the data_ready signal passed in the data stream; and unloading every N+1st word from the second stage using a fourth signal based on the local clock and the data_ready signal passed in the data stream.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
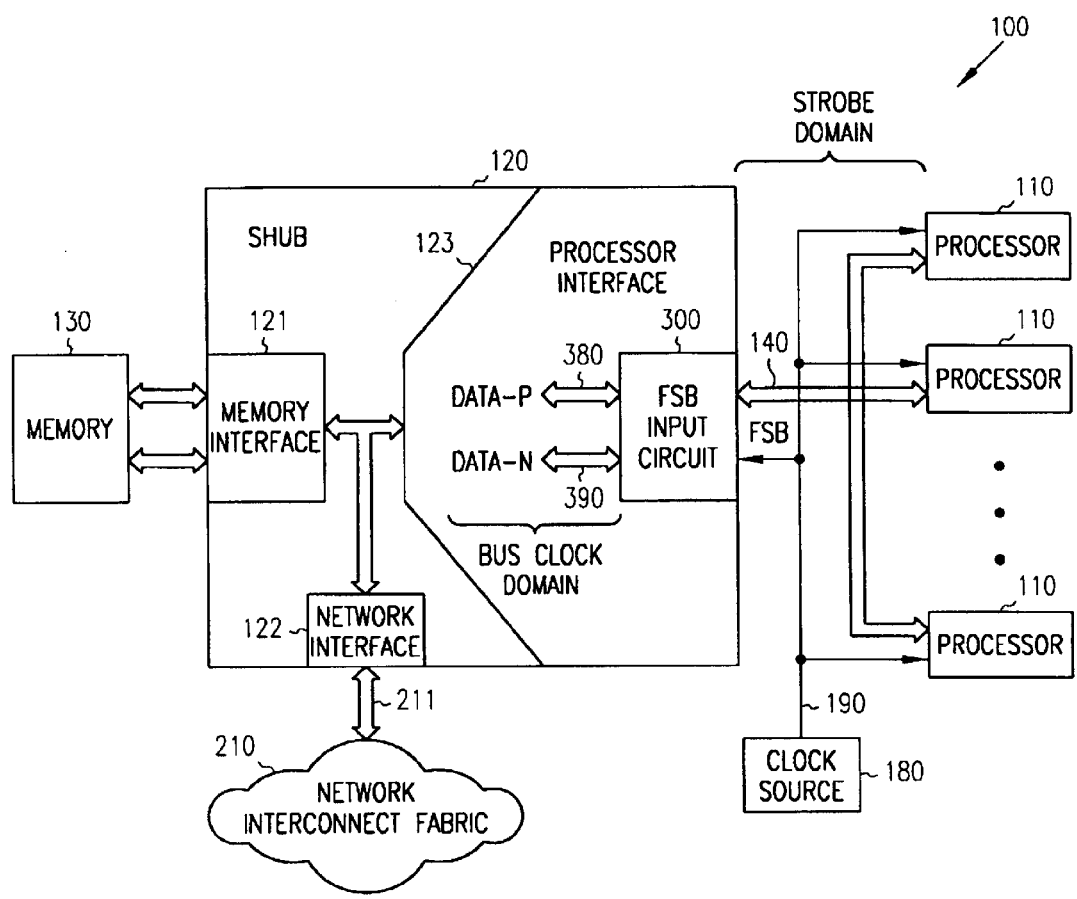
FIG. 1 shows one embodiment of the present invention having a computer system 100.

FIG. 1 shows one embodiment of the present invention having a computer system 100. System 100 includes one or more processors 110 (also called central processing units or CPUs 110), super hub (shub) chip 120 (in some embodiments, this is called a node controller 120, wherein network interface 122 is included), and memory 130. In some embodiments, CPU 110 is an ITANIUM processor available from Intel Corporation, and in other embodiments, can be any suitable processor chip or module. Bus 140 (sometimes called a front-side bus, or FSB 140) connects the one or more CPUs 110 to shub 120.

In the embodiment shown, shub 120 includes a memory interface (MI) 121 and a processor interface (PI) 123, coupled by one or more internal busses. In some embodiments, shub 120 also includes a network interface (NI) 122 coupled to a network interconnect fabric 210 (also called network 210) via a link 211 (for example, a numalink). In such embodiments, NI 122 is also connected to exchange data with MI 121 and PI 123.

In some embodiments, bus 140 is a tri-state bus (or similar bus), wherein devices connected to the bus can drive the voltage low (e.g., a data zero), drive the voltage high (e.g., a data one), or provide a high-impedance and not drive the voltage (this last state allows another device on the bus to drive the bus with its data). When a bus master releases the bus 140, it will stop driving the bus 140, and go to a high-impedance state, and the next bus master will then start to drive the bus 140. In between, the bus 140 is, or can be, in an entirely high-impedance state, in which no device is driving the bus (all devices are in a high-impedance state). This can occur in the entire bus, or on just one or a small number of lines of the bus. This is especially problematic for the strobe lines 317 (See FIG. 3 below), which are passed with the data, and which, along with the data_ready line 318, define when the transmitted data 319 are ready (see, for example, timing diagram 800 of FIG. 8 below).

During periods in which one or more lines of the bus are in an undriven or high-impedance state, these lines are quite susceptible to noise, e.g., electromagnetic signals are picked up by the high-impedance lines, such that they can have a voltage that is interpreted by receivers on the line as a voltage or a clock edge. As signal frequencies increase, radiated electromagnetic signals increase, making the problem worse. Further, in systems that attempt to change bus masters very fast, one processor 110 can be very close to shub 120 timing-wise, while another processor 110 is more distant, and thus the closer processor 110 could start driving a line while the signal from the farther processor 110 is still active due to the extra time it takes that signal to reach shub 120.

In some embodiments, as shown in FIG. 1, a common clock source 180 provides a clock signal 190 that drives each processor 110 and shub 120. Within each of these chips, the received version of the clock 190 is locally driven (or amplified and conditioned), thus generating a local version of the clock, sometimes called the local clock or the internal bus clock. In some such embodiments, the processor(s) 110 and/or shub 120 include a phase-locked-loop or similar mechanism to derive a much higher-frequency clock on-chip, for example, some embodiments use a 200 MHZ clock 190, which is locked to an 800 or 1000 MHZ clock in each processor 110. Even though the processors 110 and the shub 120 are running from the same clock 190, the phase relationship of internal local clock to the data passed from one to another of these chips will vary. Thus, it is important to re-synchronize transmitted data to the local copy of the clock.

In some embodiments, the data transmitted on bus 140 includes a strobe signal. The strobe signal generally incurs substantially the same delay as the data, and thus can be used to latch the data at its destination. In some embodiments, multiple copies of the strobe are provided, such that a separate strobe is associated with each subset of the data transmitted (e.g., eight strobes for (144) bits of data, thus one strobe for each (18) bits). In systems that allow changing of the bus master, however, during bus-master changeover, the strobe signals will become undriven, or in their high-impedance state. In some embodiments, each strobe includes a pair of complementary differential strobe signals, and during bus-master changeover, both of the pair can go high (thus no longer being complementary), leading to unreliable data.

The present invention provides both reliable data capture in the presence of bus-master changeovers, as well as synchronization to the local clock.

Figure 2:
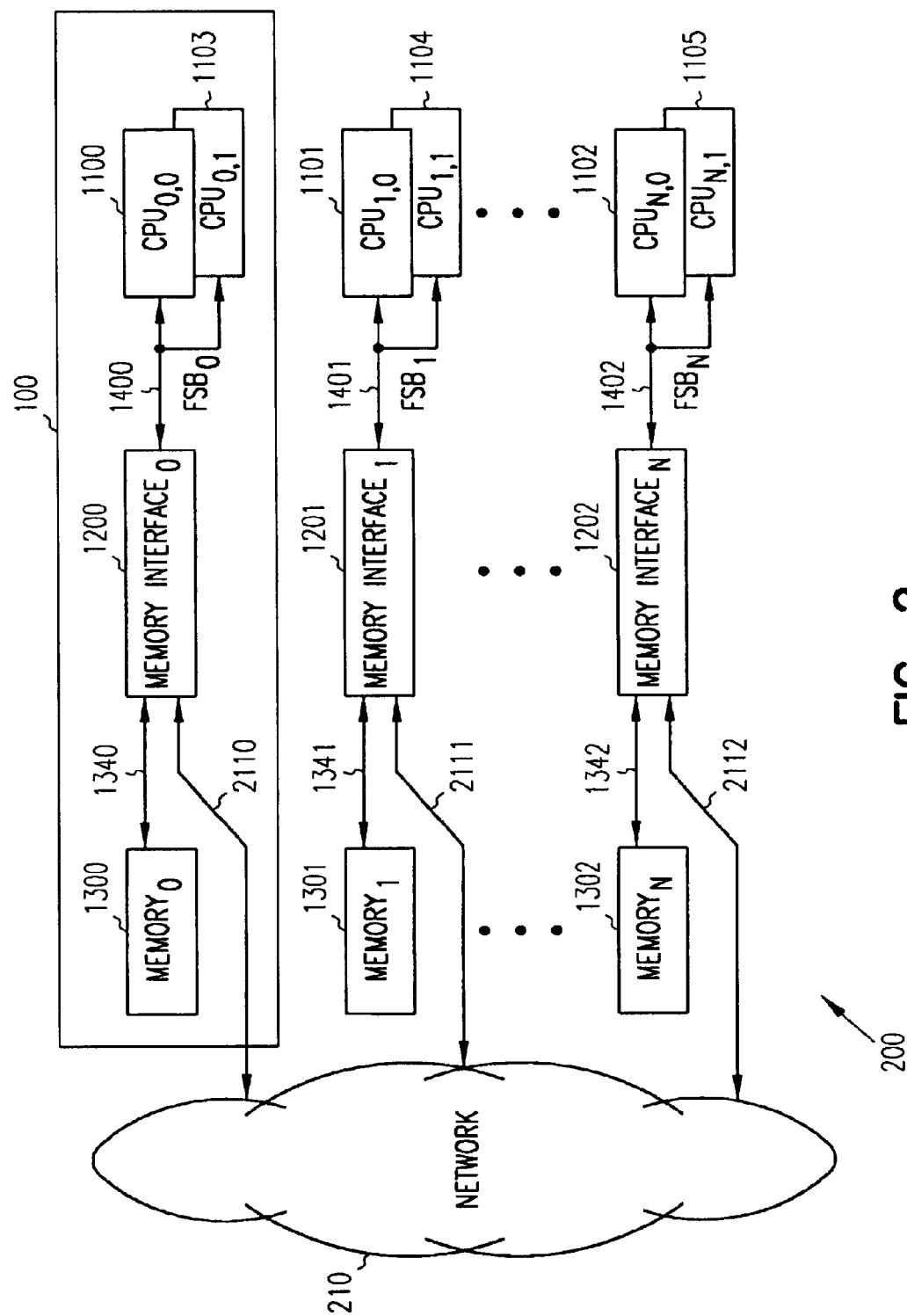
FIG. 2 shows one embodiment of the present invention having a multiprocessor computer system 200.

FIG. 2 shows one embodiment of the present invention having a multiprocessor computer system 200. In some embodiments, system 200 includes a plurality of circuits, each largely equivalent to computer system 100 of FIG. 1, and all interconnected using network 210. In the embodiment shown, a plurality of nodes 100 are coupled using network 210 in a distributed-memory multiprocessor system, each node 100 having two processors 110, one interface chip 120, and a memory 130. Each memory 130 can be accessed (read from and written to) from any processor 110. The high-order three digits of the reference numbers of FIG. 2 correspond to the reference number of FIG. 1 for corresponding elements.

Figure 3:
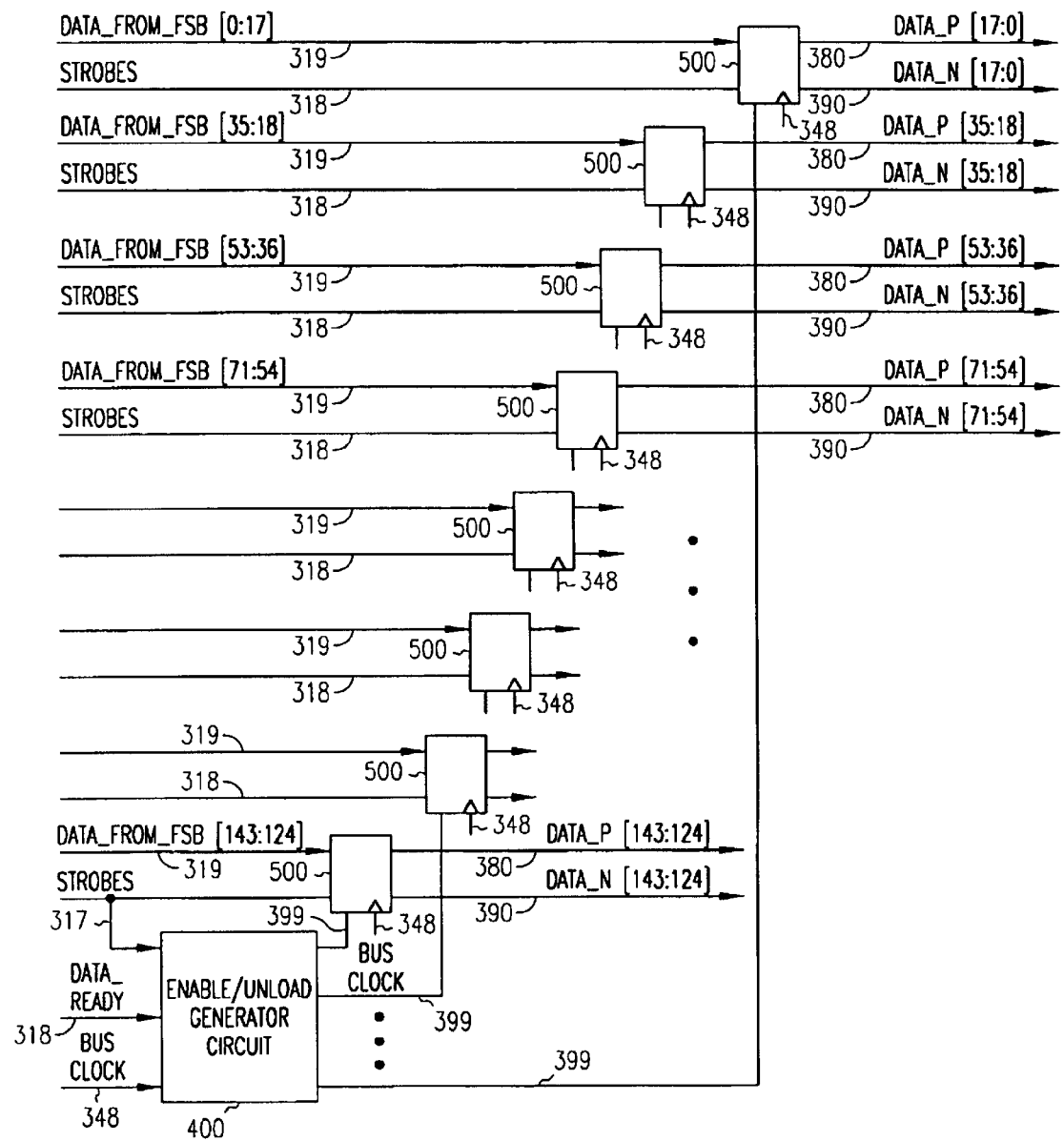
FIG. 3 is a block diagram of an FSB input circuit 300 of one embodiment of the present invention.

FIG. 3 is a block diagram of an FSB input circuit 300 of one embodiment of the present invention. In some embodiments, FSB 140 provides data_from_fsb bits 319 (i.e., the data signals from the FSB 140, in some embodiments, for example, (144) bits comprising (128) bits of data and (16) bits of error-correction code (ECC) are used), one or more data strobes 317, and one or more data_ready signals 318. The data strobes 317 are passed from a processor 110 along with the data_from_fsb bits 319 to provide an accurate timing signal for strobing the data at the receiver. In some embodiments, strobes 317 include a pair of complementary differential strobe signals 417 and 467 (see FIG. 4), in order to provide very fast accurate edges for clocking (or strobing) the data at the receiver. In some embodiments, a separate pair of complementary differential strobes 417 and 467 (also called STRp 417 and STRn 467) is provided for every 18 bits of data/ECC, for a total of eight pairs of strobes 417 and 467.

Inside shub 120, the data are passed using a common bus clock 348. In some embodiments, bus clock 348 is also sent to and used within each processor 110, however, due to the varying distances interconnecting processor(s) 110 and shub 120, it is desirable to synchronize the incoming data signals to the version of bus clock 348 used within shub 120. Further, in some embodiments, it is desirable to have two or more data busses internal to shub 120, where each internal bus runs at a slower speed than does FSB 140. Thus, in some embodiments, two internal busses, data_p and data_n are provided, each carrying every other word from FSB 140. One data word is associated with each up transition and another data word is associated with each down transition of the data strobes (or equivalently, one data word is associated with each down transition of STRp 417 and another data word is associated with each down transition of STRn 467. Thus, FSB input circuit 300 receives input from FSB 140 including (144) parallel bits of data/ECC, and generates two parallel data busses, called data_p 380 and data_n 390, internal to shub chip 120. Every other word (e.g., the even-numbered words) is placed on data_p 380 and the other words (e.g., the odd-numbered words) is placed on data_n 390.

In the embodiment shown, eight copies of three-stage latch-mux clock converter circuit 500 are provided, each receiving (18) bits of the FSB bus and generating (18) bits of data_p 380 and (18) bits data_n 390. One copy of load-select-enable/unload generator circuit 400 provides the load_selects and/or enables needed to gate the circuits 500. The output busses data_p 380 and data_n 390 are thus in the bus-clock domain of shub 120. Control signals 399 from load-select-enable/unload generator circuit 400 control the loading of data from bus 140 into the latches of circuit 500 (using signals based on strobes passed with the data) and the unloading of data from the latches of circuit 500 (using signals based on the local clock 348 (also called the bus clock 348).

Note that in other embodiments, bus-input circuit 300 is implemented in each processor 110, in order that bus-master changeovers and/or clock-domain changes are better handled. In some embodiments, bus-input circuit 300 is implemented in both node controller 120 and in each processor 110. In other embodiments, bus-input circuit 300 is implemented in other devices coupled together on a common bus, such as separate chips coupled together with an inter-chip bus, or logic subsets within a chip coupled together with an intra-chip bus.

Figure 4:
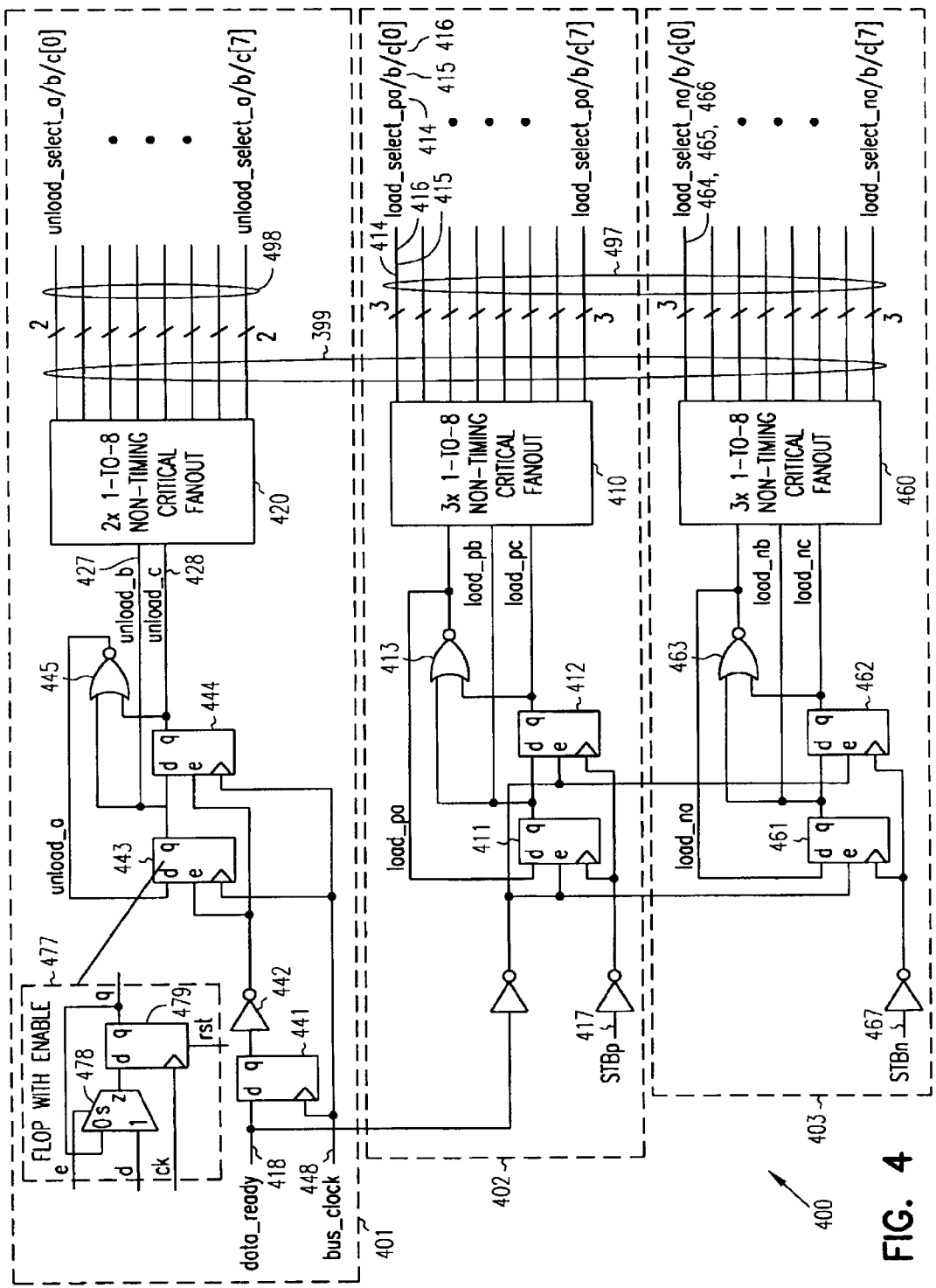
FIG. 4 is a block diagram of a load-select-enable/unload-signal generator circuit 400 of one embodiment of the present invention.

FIG. 4 is a block diagram of a load-select-enable/unload-signal generator circuit 400 of one embodiment of the present invention. Circuit 400 includes an unload-signal generator circuit 401, a load_select_p generator circuit 402, and a load_select_n generator circuit 403. In some embodiments, latch-enable gating circuit 510 (see FIG. 5) is conceptually grouped within circuit 400, such that circuit 400 is considered to generate the enable signals 499 used to control the loading of data from bus 140 into the latches of circuit 500, and the unload signals 498 used to control the unloading of data from the latches of circuit 500.

In some embodiments, unload-signal generator circuit 401 includes a d-type latch 441, having a data input coupled to the data_ready signal from bus 140 and a clock input coupled to the bus clock 448 (also called the local clock 448 of node controller 120). The output of latch 441 is inverted by invertor 442, and then goes to the enable input of latches 443 and 444, which are both clocked by bus clock 448. The output of latch 443 feeds the d-input of latch 444, and also provides unload_b signal 427. The output of latch 443 also feeds the input of NOR gate 445, the output of latch 444 feeds the other input of NOR gate 445 (and also provides unload_c signal 428), and the output of NOR gate 445 feed the d-input of latch 443. Both unload_c signal 428 and unload_b signal 427 are driven by one-to-eight drivers 420 to fanout to circuits 500. When unload_c signal 428 is asserted, the c-stage of the latches 533 and 563 are unloaded, when unload_b signal 427 is asserted, the b-stage of the latches 532 and 562 are unloaded, and when neither is asserted, the a-stage of the latches 531 and 561 are unloaded (see also FIG. 5). Latches 443, 444, and NOR gate 445 form a recirculating shift register having three states, one for each stage of latches 531, 532, and 533 (and 561, 562, and 563).

Circuits 402 and 403 are similar to circuit 401, but uses strobe STBp 417 rather than bus clock 448, and use rotating bits having a different delay/phase.

Thus circuit 400 provides control signals that can be generated in a non-time-critical basis, to convert strobe-domain data to bus-clock-domain data, and also to remove bus-master changeover glitch problems.

Further, the same data_ready signal can be used in both the strobe-domain loading operations and the bus-clock domain unloading operations to define when transfers can occur, and thus, for example, can be used to remove bus-changeover problems.

In some embodiments, (see FIG. 7) the data_ready is asserted for an entire clock period, the data changes at 0% and 50% of the clock period, and the strobes change at 25% and 75% of the clock period. During bus master changeovers, the strobes can "glitch," which in other embodiments will cause errors. Other embodiments often use analog glitch-suppression circuitry, which is complex, expensive, and/or slow.

In some embodiments, circuits 402, 403, and 510 act together to AND the strobe with the data_ready and with a rotating bit (e.g., a bit rotating or circulating in latches 411 and 412. By ANDing these three signals together, problems otherwise caused by glitches on the strobes are reduced or eliminated. Since the unload signals 498 are based on local bus clock and on data_ready, they will unload the latches 530 (see FIG. 5) after the latches 530 have been loaded with data. Thus, input circuit 300 forms a FIFO (first-in-first-out) circuit to convert strobe-domain data on bus 140 to bus-clock domain data on data_p and data_n busses, while also eliminating problems due to glitches on the strobes, including glitches due to bus-master changeover.

Note that each of latches 443, 444, 411, 412, 461, and 462 are implemented as a flop-with-enable 477 as shown. In some embodiments, flop-with-enable 477 includes a d-type latch 479 having a data input, clock input, and q output, wherein the q output feeds back to input-0 of multiplexor 478, the d-input of flop-with-enable 477 is connected to the input-1 of multiplexor 478, and the output of mux 478 feeds the d-input of latch 479. Note: this is not a gated-clock type enable.

Figure 5:
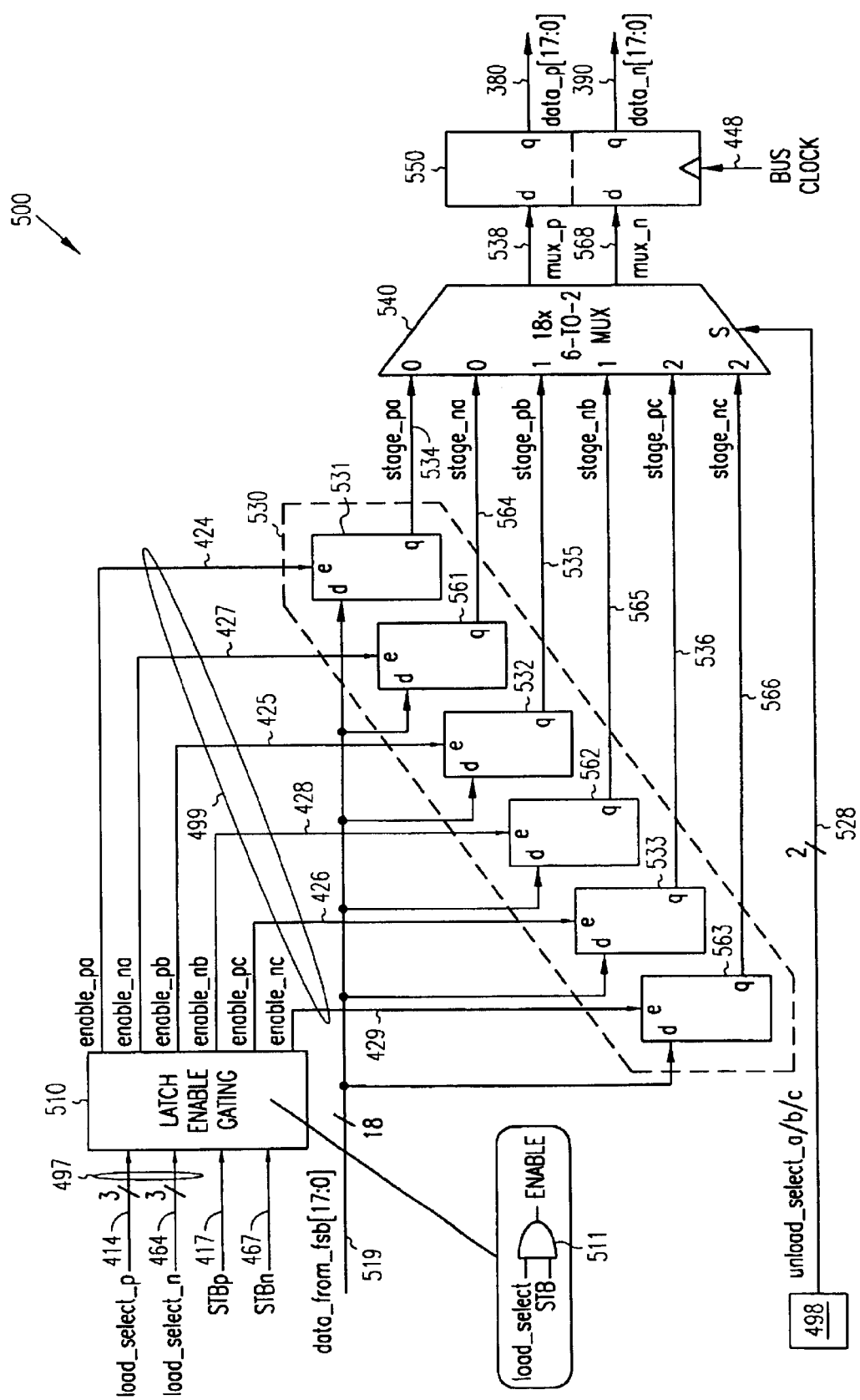
FIG. 5 is a block diagram of a three-stage latch-mux clock converter circuit 600 of one embodiment of the present invention.

FIG. 5 is a block diagram of a three-stage latch-mux clock converter circuit 500 of one embodiment of the present invention. Latch enable gating 510 includes six two-input AND gates 511 which AND the three phases of load_select_p 414 with STBp 417, and the three phases of load_select_n 464 with STBn 467, respectively, to generate the six successive phases of enable signals 499. Each phase of enable signal 499 drives a separate one of the (18)-bit latch stages 530. Successively, multiplexor 540 selects one of the three signals: stage_pa 534, stage_pb 535, or stage_pc 536, to output to mux_p 538, and also selects one of the three signals: stage_na 564, stage_nb 565, or stage_nc 566, to output to mux_n 568. In turn mux_p 538 and mux_n 568 are latched into flop stages 550 by bus clock 448. Flop stages 550 output busses data_p 380 and data_n 390.

Figure 6:
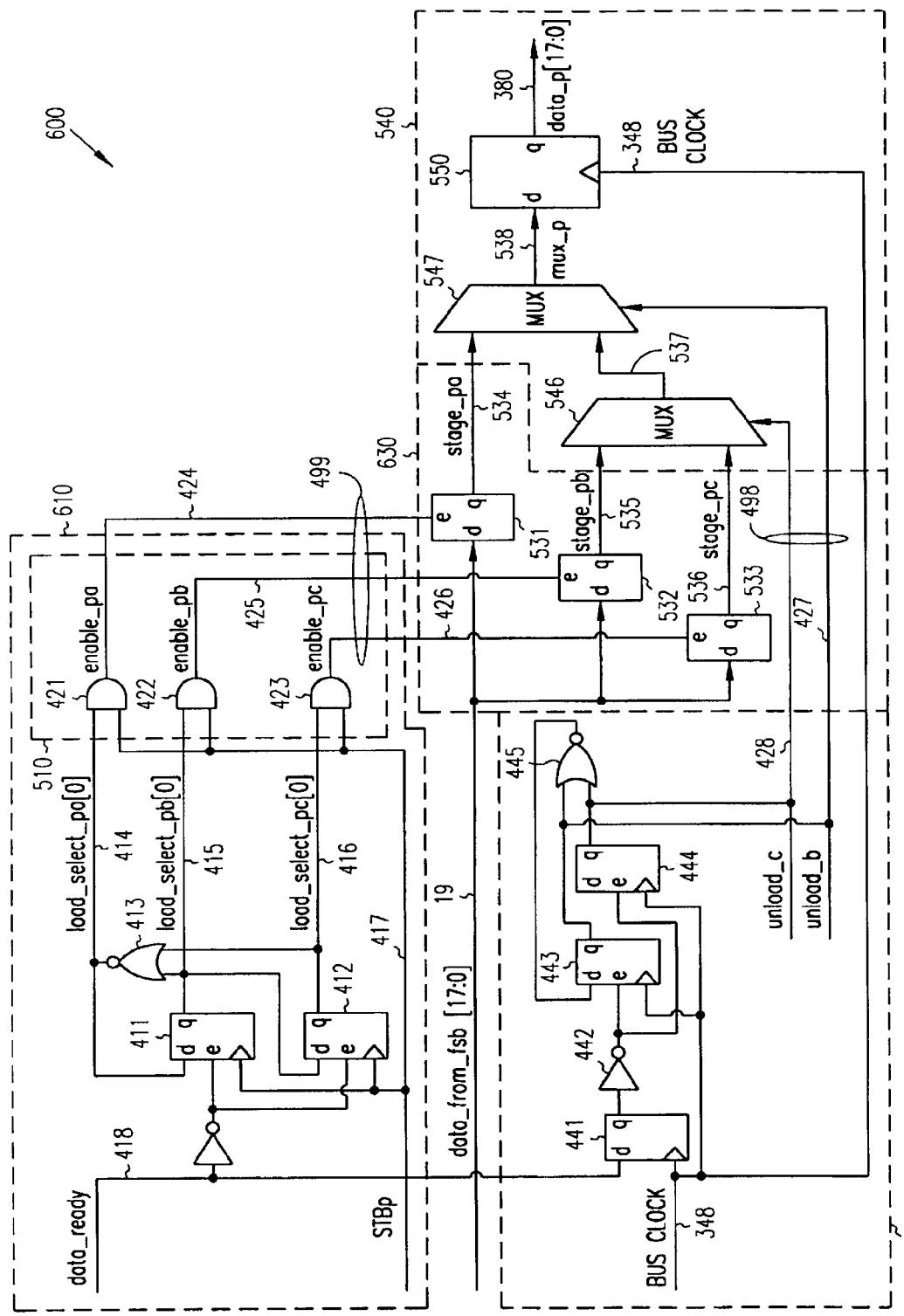
FIG. 6 is a block diagram of an FSB input circuit 600 of one embodiment of the present invention.

FIG. 6 is a block diagram of an FSB input circuit 600 of one embodiment of the present invention. FSB input circuit 600 represents a simplified version of FSB input circuit 300 shown in FIGS. 3, 4, and 5 together.

In some embodiments, FSB 140 is "double-pumped" in that the sender of data places two words of data on the bus every clock period (e.g., for a 200 MHZ clock period (5 nanosecond per clock), two words of data are provided one after the other, for a data rate of 400 MHZ (2.5 nanoseconds per word)).

FSB input circuit 600 can be used for embodiments having only one word per clock, or can be implemented twice, once for STBp and again for STBn, as described for FIGS. 3, 4, and 5. The reference numerals of elements of FIG. 6 that are the same as elements in FIG. 4 and 5 correspond to identical functions and structures.

Figure 7:
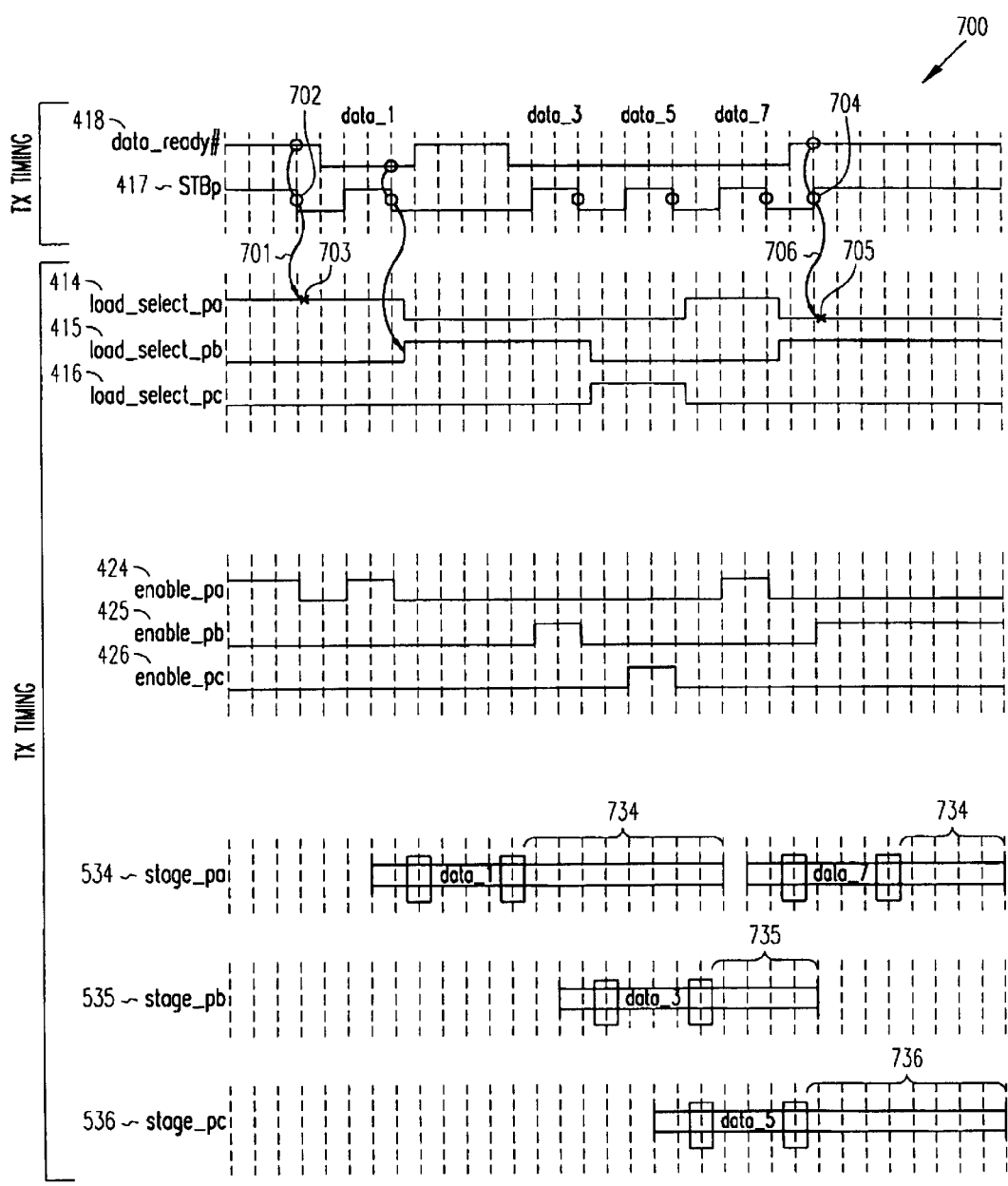
FIG. 7 is a timing diagram 700 for the FSB input circuit 600 of one embodiment of the present invention.

FIG. 7 is a timing diagram 700 for the FSB input circuit 600 of one embodiment of the present invention. The reference numerals for signal timing in FIG. 7 correspond to signal lines of FIG. 6. The unload selections for stage_pa data 534 can be made any place within time period 734, the unload selections for stage_pa data 535 can be made any place within time period 735, and the unload selections for stage_pa data 536 can be made any place within time period 736.

Note that glitch situation 701 (where strobe 417 glitches downward 702) does not cause a load_select glitch at 703, and glitch situation 706 (where strobe 417 glitches up 704) does not cause a load_select glitch at 705.

Figure 8:
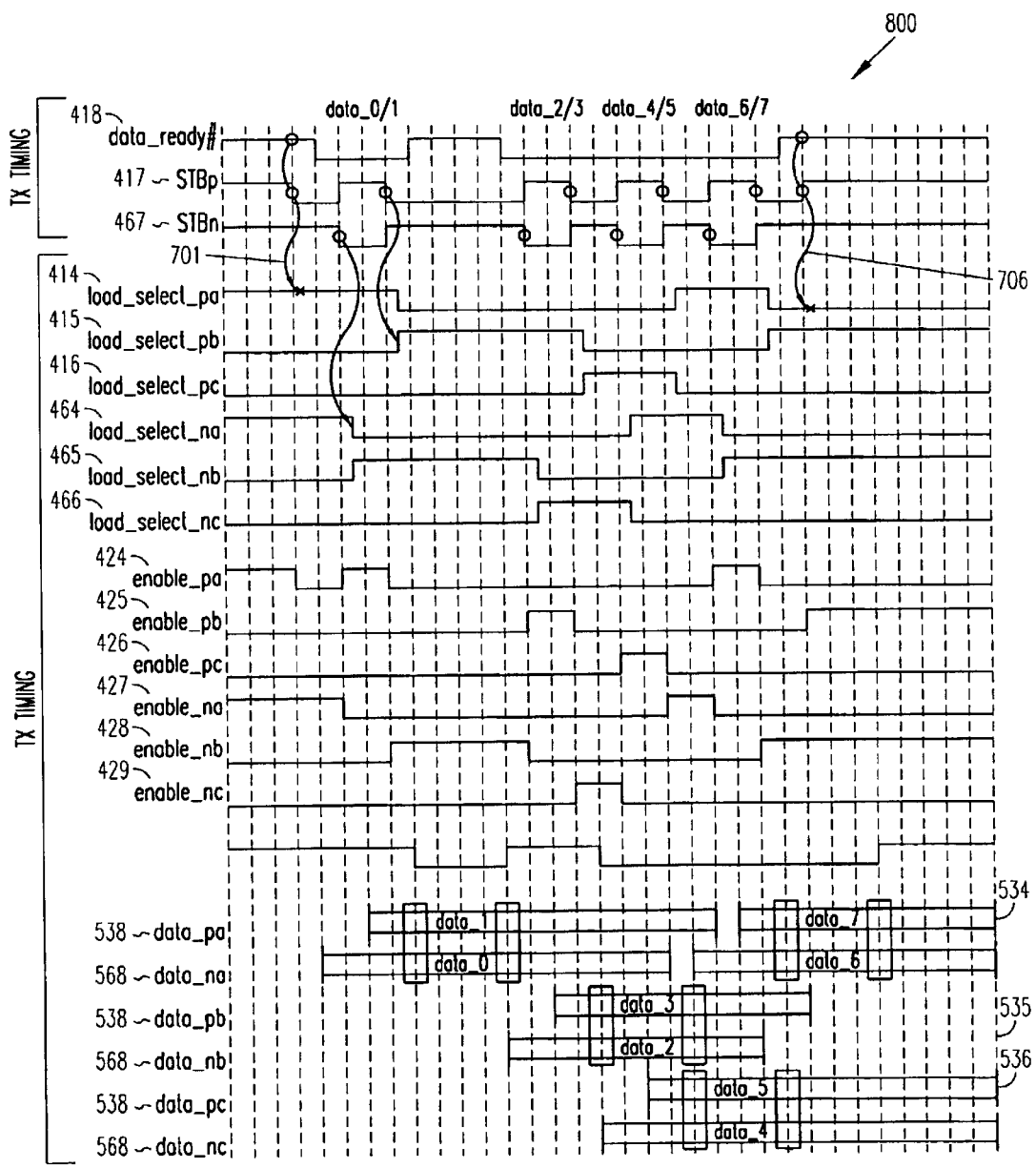
FIG. 8 is a timing diagram 800 for the FSB input circuit 300 of one embodiment of the present invention.

FIG. 8 is a timing diagram 800 for the FSB input circuit 300 of one embodiment of the present invention. This is a more comprehensive timing diagram corresponding to FIGS. 3, 4, and 5, wherein double-pumped data busses and complementary strobes are used. Note that potential glitch problems 701 and 706 still do not cause problems for the loading enables or load_select signals.

Conclusion

One aspect of the present invention provides a method for reliable data capture. The method includes: providing an N-stage latch including a first stage latch and a second stage latch, wherein N is two or larger; loading every Nth word of a data stream into the first stage latch using a first signal based on a strobe passed in the data stream; loading every N+1st word of the data stream into the second stage latch using a second signal based on the strobe passed in the data stream; unloading every Nth word from the first stage latch using a third signal based on an internal bus clock; and unloading every N+1st word from the second stage latch using a fourth signal based on the internal bus clock.

In some embodiments, N is three, the N-stage latch further including a third stage latch, the method further including loading every N+2nd word into the third stage latch using a fifth signal based on the strobe passed in the data stream; and unloading every N+2nd word from the third stage latch using a sixth signal based on the internal bus clock.

In some embodiments, the strobe includes a pair of complementary differential strobe signals.

In some embodiments, the first, second and fifth signals are based on circulating pulses based on the strobe passed in the data stream and on a data ready signal passed in the data stream.

In some embodiments, the third, fourth and sixth signals are based on circulating pulses based on the internal bus clock and on a data ready signal passed in the data stream.

Another aspect of the present invention provides a method for reliable data capture. This method includes providing an N-stage latch including a first stage latch and a second stage latch, wherein N is four or larger; loading every Nth word of a data stream into the first stage latch; using a first signal based on a strobe passed in the data stream; loading every N+2nd word of the data stream into the second stage latch using a second signal based on the strobe passed in the data stream, wherein M is two or larger; unloading every Nth word from the first stage latch using a third signal based on an internal bus clock; and unloading every N+2nd word from the second stage latch using a fourth signal based on the internal bus clock.

In some embodiments of this second method, the strobe includes a pair of complementary differential strobe signals.

In some embodiments, N is six, the N-stage latch further including a third stage latch, and the method further includes loading every N+4th word into the third stage latch using a fifth signal based on the strobe passed in the data stream; and unloading every N+4th word from the third stage latch using a sixth signal based on the internal bus clock.

In some embodiments, the first, second and fifth signals are based on circulating pulses based on the strobe passed in the data stream and on a data ready signal passed in the data stream.

In some embodiments, the third, fourth and sixth signals are based on circulating pulses based on the internal bus clock and on a data ready signal passed in the data stream.

In some embodiments, the strobe includes a pair of complementary differential strobe signals.

In some embodiments, N is six, the N-stage latch further including a third stage latch, a fourth stage latch, a fifth stage latch, and a sixth stage latch. Such a method further includes loading every N+1st word of the data stream into the third stage latch using a fifth signal based on the strobe passed in the data stream; loading every N+3rd word into the fourth stage latch using a sixth signal based on the strobe passed in the data stream; loading every N+4th word of the data stream into the fifth stage latch using a seventh eighth signal based on the strobe passed in the data stream; loading every N+5th word of the data stream into the sixth stage latch using an eighth signal based on a strobe passed in the data stream; unloading every N+1st word from the fourth stage latch using a ninth signal based on an internal bus clock; unloading every N+3rd word from the third stage latch using a tenth signal based on the internal bus clock; unloading every N+4th word from the fifth stage latch using an eleventh signal based on the internal bus clock; and unloading every N+5th word from the sixth stage latch using a twelfth signal based on the internal bus clock.

Another aspect of the present invention provides an improved circuit 600 (See FIG. 6) for reliable capture of data words from a data stream. The circuit includes an enable-signal circuit 610 that provides a first signal 424 based on a strobe passed in the data stream and a second signal 425 based on the strobe passed in the data stream; an N-stage latch 630 including a first stage latch 531 and a second stage latch 532, wherein N is two or larger, and wherein the first signal 424 loads every Nth word of a data stream into the first stage latch using the first signal, and second signal 425 loads every N+1st word of the data stream into the second stage latch 532 using the second signal; an unload-signal circuit 620 that provides a third signal 428 based on an internal bus clock and a fourth signal 427 based on the internal bus clock; and a multiplexor 547 having a data input connected to an output of the first stage latch and having another data input connected to an output of the second stage latch and a control input operatively coupled to the unload-signal circuit, wherein the multiplexor 547 selects every Nth word from the first stage latch based on the third signal and selects every N+1st word from the second stage latch based on the fourth signal.

In some embodiments, N is three, the N-stage latch further including a third stage latch, wherein the enable-signal circuit further provides a fifth signal based on the strobe passed in the data stream, the fifth signal operatively coupled to the third stage latch to load every N+2nd word into the third stage latch, and wherein the unload-signal circuit further provides a sixth signal based on based on the internal bus clock, the sixth signal operatively coupled to the third stage latch to select every N+2nd word from the third stage latch.

In some embodiments, the strobe includes a pair of complementary differential strobe signals.

In some embodiments, the enable-signal circuit generates a circulating set of pulses based on the strobe passed in the data stream and on a data ready signal passed in the data stream.

In some embodiments, the unload-signal circuit generates a circulating set of pulses based on the internal bus clock and on a data ready signal passed in the data stream.

Yet another aspect of the present invention provides a circuit 300 for reliable capture of data words from a data stream. Circuit 300 includes an enable-signal circuit that provides a first signal based on a strobe passed in the data stream and a second signal based on the strobe passed in the data stream; an N-stage latch operatively coupled to the enable-signal circuit including a first stage latch and a second stage latch, wherein N is four or larger, and wherein the first stage latch loads every Nth word of a data stream based on the first signal, and the second stage latch loads every N+2nd word of the data stream based on the second signal; an unload-signal circuit that provides a third signal based on an internal bus clock and a fourth signal based on the internal bus clock; and a multiplexor having a data input connected to an output of the first stage latch and having another data input connected to an output of the second stage latch and a control input operatively coupled to the unload-signal circuit, wherein the multiplexor selects every Nth word from the first stage latch based on the third signal and selects every N+2nd word from the second stage latch based on the fourth signal.

In some embodiments, the strobe includes a pair of complementary differential strobe signals.

In some embodiments, N is six, the N-stage input-latch further including a third stage latch, wherein the enable-signal circuit provides a fifth signal based on the strobe passed in the data stream, and wherein the third stage latch loads every N+4th word using the fifth signal, and wherein the unload-signal circuit provides a sixth signal based on the internal bus clock and the multiplexor selects every N+4th word from the third stage latch based on the sixth signal.

In some embodiments, the enable-signal circuit generates a circulating set of pulses based on the strobe passed in the data stream and on a data ready signal passed in the data stream.

In some embodiments, the unload-signal circuit generates a circulating set of pulses based on the internal bus clock and on a data ready signal passed in the data stream.

In some embodiments, the strobe includes a pair of complementary differential strobe signals.

In some embodiments, N is six, and the N-stage input-latch further includes a third stage latch, a fourth stage latch, a fifth stage latch, and a sixth stage latch, each respective stage latch controlled by a respective signal from the enable-signal circuit to load every N+1st word of the data stream into the third stage latch, every N+3rd word into the fourth stage latch, every N+4th word of the data stream into the fifth stage latch, every N+5th word of the data stream into the sixth stage latch, and the multiplexor is coupled to receive respective signals provided by the unload-signal circuit based on the internal bus clock to select every N+1st word from the fourth stage latch, every N+3rd word from the third stage latch, every N+4th word from the fifth stage latch, and every N+5th word from the sixth stage latch.

Still another aspect of the present invention provides a multiprocessor system 200 that includes the circuit of one or more embodiments described above, the system 200 further including a bus 140, a plurality of processors 110 each operably coupled to the bus 110, an interface chip 120 operably coupled to the bus 140, and a memory 130 operably coupled to the interface chip 120.

In some embodiments of multiprocessor system 200, the interface chip 120 is a node controller, and the system further includes a network 210 operably coupled to the interface chip 120 and to one or more other interface chips 120, each one of the one or more other interface chips 120 each operably coupled to a respective bus 140, each respective bus 140 operably coupled to a plurality of other processors 110, and each one of the one or more other interface chips 120 further operably coupled to a respective memory 130.

In some embodiments, the first signal 424 and the second signal 425 are further based on a first stage selector 411–412, and on a data_ready signal 418 passed in the data stream.

In some embodiments, the third signal and the fourth signal are further based on a second stage selector, and on the data_ready signal passed in the data stream.

Still another aspect of the present invention provides a a method for reliable data capture from a bus, the method including: providing an N-stage FIFO including a first stage and a second stage, wherein N is two or larger; loading every Nth word of a data stream into the first stage using a first signal based on a stage selector, and on a strobe and a data_ready signal passed in the data stream; loading every N+1st word of the data stream into the second stage latch using a second signal based on the stage selector, and on the strobe and the data_ready signal passed in the data stream; unloading every Nth word from the first stage using a third signal based on a local clock and the data_ready signal passed in the data stream; and unloading every N+1st word from the second stage using a fourth signal based on the local clock and the data_ready signal passed in the data stream.

In some embodiments, a key point is that the load_select terms (see FIG. 6 and FIG. 7) are used to gate the latch enables (enable_a 424, enable_b 425, and enable_c 426). These terms change at falling STB edges, but only when data_ready 418 is asserted. Another key point is there is only one copy of data_ready 418 from the bus 140. In order to control skew between it and the STB signal 417 it gates, the load_select signals are generated only in one place, but those signals are not particularly timing-critical, so there is time to fan them out to all eight strobe groups. a further key point, in some embodiments, is that the pre-drive and post-drive strobe edges (and any other spurious edges that may occur when data_ready 418 is deasserted) will only affect the capture stages (and not the load_select logic 610). This is acceptable, since any previously captured data will have already been unloaded into the local core clock domain by the time this can happen.

Thus, one fundamental problem is that a tri-state bus with multiple masters and common (tri-state) differential data strobes. During bus-master changeover, the differential receivers for the strobes can glitch, causing unintentional latching actions that lead to data corruption and errors.

The invention provides complete immunity to glitching on the differential strobes during bus-master changeovers and other times when data is not actively being transferred. It does this without requiring analog circuitry solutions that cannot guarantee immunity anyway. It does this without applying any timing-critical logic on the transfer control signals before they are received from the source bus into latches, and does this such that the timing for resulting control within the data receiver unit is relaxed, and thus facilitates ease of physical chip layout, in spite of very wide data busses (e.g., up to (144) bits or more).

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for reliable data capture, the method comprising:
   providing an N-stage latch including a first stage latch, a second stage latch and a third stage latch, wherein N is at least three;
   loading every Nth word of a data stream into the first stage latch using a first signal based on a strobe passed in the data stream;
   loading every N+1st word of the data stream into the second stage latch using a second signal based on the strobe passed in the data stream;
   loading every N+2nd word into the third stage latch using a fifth signal based on the strobe passed in the data stream;
   unloading every Nth word from the first stage latch to a first internal bus using a third signal based on an internal bus clock;
   unloading every N+1st word from the second stage latch to a second internal bus using a fourth signal based on the internal bus clock; and
   unloading every N+2nd word from the third stage latch to the first internal bus using a sixth signal based on the internal bus clock.

2. The method of claim 1, wherein the third, fourth and sixth signals are based on circulating pulses based on the internal bus clock and on a data ready signal passed in the data stream.

3. A method for reliable data capture, the method comprising:
   providing an N-stage latch including a first stage latch, a second stage latch and a third stage latch, wherein N is three or larger;
   loading every Nth word of a data stream into the first stage latch using a first signal based on a strobe passed in the data stream;
   loading every N+1st word of the data stream into the second stage latch using a second signal based on the strobe passed in the data stream;
   loading every N+2nd word into the third stage latch using a fifth signal based on the strobe passed in the data stream;
   unloading every Nth word from the first stage latch using a third signal based on an internal bus clock;
   unloading every N+1st word from the second stage latch using a fourth signal based on the internal bus clock; and
   unloading every N+2nd word from the third stage latch using a sixth signal based on the internal bus clock,
   wherein the strobe includes a pair of complementary differential strobe signals.

4. A method for reliable data capture, the method comprising:
   providing an N-stage latch including a first stage latch, a second stage latch and a third stage latch, wherein N is three or larger;
   loading every Nth word of a data stream into the first stage latch using a first signal based on a strobe passed in the data stream;
   loading every N+1st word of the data stream into the second stage latch using a second signal based on the strobe passed in the data stream;
   loading every N+2nd word into the third stage latch using a fifth signal based on the strobe passed in the data stream;
   unloading every Nth word from the first stage latch using a third signal based on an internal bus clock;
   unloading every N+1st word from the second stage latch using a fourth signal based on the internal bus clock; and
   unloading every N+2nd word from the third stage latch using a sixth signal based on the internal bus clock,
   wherein the first, second and fifth signals are based on circulating pulses based on the strobe passed in the data stream and on a data ready signal passed in the data stream.

5. A method for reliable data capture, the method comprising:
   providing an N-stage latch including a first stage latch and a second stage latch, wherein N is four or larger;
   loading every Nth word of a data stream into the first stage latch using a first signal based on a strobe passed in the data stream;
   loading every N+2nd word of the data stream into the second stage latch using a second signal based on the strobe passed in the data stream;
   unloading every Nth word from the first stage latch to a first internal bus using a third signal based on an internal bus clock; and
   unloading every N+2nd word from the second stage latch to the first internal bus as next in time to a just-prior Nth word using a fourth signal based on the internal bus clock.

6. The method of claim 5, wherein N is six, the N-stage latch further including a third stage latch, the method further comprising:
   loading every N+4th word into the third stage latch using a fifth signal based on the strobe passed in the data stream; and
   unloading every N+4th word from the third stage latch to the first internal bus as next in succession to the just-prior N+2nd word using a sixth signal based on the internal bus clock.

7. The method of claim 6, wherein the third, fourth and sixth signals are based on circulating pulses based on the internal bus clock and on a data ready signal passed in the data stream.

8. The method of claim 5, wherein N is six, the N-stage latch further including a third stage latch, a fourth stage latch, a fifth stage latch, and a sixth stage latch, the method further comprising:

loading every N+1st word of the data stream into the third stage latch using a fifth signal based on the strobe passed in the data stream;

loading every N+3rd word into the fourth stage latch using a sixth signal based on the strobe passed in the data stream;

loading every N+4th word of the data stream into the fifth stage latch using a seventh eighth signal based on the strobe passed in the data stream;

loading every N+5th word of the data stream into the sixth stage latch using an eighth signal based on a strobe passed in the data stream;

unloading every N+1st word from the fourth stage latch to a second internal bus using a ninth signal based on an internal bus clock;

unloading every N+3rd word from the third stage latch to the second internal bus using a tenth signal based on the internal bus clock;

unloading every N+4th word from the fifth stage latch to the first internal bus using an eleventh signal based on the internal bus clock; and unloading every N+5th word from the sixth stage latch to the second internal bus using a twelfth signal based on the internal bus clock.

9. A method for reliable data capture, the method comprising:

providing an N-stage latch including a first stage latch and a second stage latch, wherein N is four or larger;

loading every Nth word of a data stream into the first stage latch using a first signal based on a strobe passed in the data stream;

loading every N+2nd word of the data stream into the second stage latch using a second signal based on the strobe passed in the data stream;

unloading every Nth word from the first stage latch using a third signal based on an internal bus clock; and unloading every N+2nd word from the second stage latch using a fourth signal based on the internal bus clock wherein the strobe includes a pair of complementary differential strobe signals.

10. A method for reliable data capture, the method comprising:

providing an N-stage latch including a first stage latch, a second stage latch and a third stage latch, wherein N is six or larger;

loading every Nth word of a data stream into the first stage latch using a first signal based on a strobe passed in the data stream;

loading every N+2nd word of the data stream into the second stage latch using a second signal based on the strobe passed in the data stream;

loading every N+4th word into the third stage latch using a fifth signal based on the strobe passed in the data stream;

unloading every Nth word from the first stage latch using a third signal based on an internal bus clock; and unloading every N+2nd word from the second stage latch using a fourth signal based on the internal bus clock; and unloading every N+4th word from the third stage latch using a sixth signal based on the internal bus clock, wherein the first, second and fifth signals are based on circulating pulses based on the strobe passed in the data stream and on a data ready signal passed in the data stream.

11. The method of claim 10, wherein the strobe includes a pair of complementary differential strobe signals.

12. A circuit for reliable capture of data words from a data stream, the circuit comprising:

an enable-signal circuit that provides a first signal based on a strobe passed in the data stream, a second signal based on the strobe passed in the data stream and a fifth signal based on the strobe passed in the data stream;

an N-stage latch including a first stage latch, a second stage latch and a third stage latch, wherein N is three or more, wherein the first signal loads every Nth word of a data stream into the first stage latch using the first signal, and loads every N+1st word of the data stream into the second stage latch using the second signal, the fifth signal operatively coupled to the third stage latch to load every N+2nd word into the third stage latch, and wherein the unload-signal circuit further provides a sixth signal based on the internal bus clock, the sixth signal operatively coupled to the third stage latch to select every N+2nd word from the third stage latch to the first internal bus.

13. The circuit of claim 12, wherein the unload-signal circuit generates a circulating set of pulses based on the internal bus clock and on a data ready signal passed in the data stream.

14. A circuit for reliable capture of data words from a data stream, the circuit comprising:

an enable-signal circuit that provides a first signal based on a strobe passed in the data stream, a second signal based on the strobe passed in the data stream, and a fifth signal based on the strobe passed in the data stream;

an N-stage latch including a first stage latch, a second stage latch and a third stage latch, wherein N is three or larger, and wherein the first signal loads every Nth word of a data stream into the first stage latch using the first signal, and the second signal loads every N+1st word of the data stream into the second stage latch using the second signal, and the fifth signal is operatively coupled to the third stage latch to load every N+2nd word into the third stage latch;

an unload-signal circuit that provides a third signal based on an internal bus clock, a fourth signal based on the internal bus clock and a sixth signal based on based on the internal bus clock; and a multiplexor having a data input connected to an output of the first stage latch and having another data input connected to an output of the second stage latch and a control input operatively coupled to the unload-signal circuit, wherein the multiplexor selects every Nth word from the first stage latch based on the third signal, and selects every N+1st word from the second stage latch based on the fourth signal and second signal, and selects every N+2nd word from the third stage latch based on the sixth signal, wherein the strobe includes a pair of complementary differential strobe signals.

15. A circuit for reliable capture of data words from a data stream, the circuit comprising:
- an enable-signal circuit that provides a first signal based on a strobe passed in the data stream, a second signal based on the strobe passed in the data stream, and a fifth signal based on the strobe passed in the data stream;
- an N-stage latch including a first stage latch, a second stage latch and a third stage latch, wherein N is three or larger, and wherein the first signal loads every Nth word of a data stream into the first stage latch using the first signal, the second signal loads every N+1st word of the data stream into the second stage latch using the second signal, and the fifth signal loads every N+2nd word into the third stage latch;
- an unload-signal circuit that provides a third signal based on an internal bus clock, a fourth signal based on the internal bus clock and a sixth signal based on based on the internal bus clock; and
- a multiplexor having a data input connected to an output of the first stage latch and having another data input connected to an output of the second stage latch and a control input operatively coupled to the unload-signal circuit, wherein the multiplexor selects every Nth word from the first stage latch based on the third signal, and selects every N+1st word from the second stage latch based on the fourth signal and second signal, and selects every N+2nd word from the third stage latch based on the sixth signal, wherein the enable-signal circuit generates a circulating set of pulses based on the strobe passed in the data stream and on a data ready signal passed in the data stream.

16. A circuit for reliable capture of data words from a data stream, the circuit comprising:
- an enable-signal circuit that provides a first signal based on a strobe passed in the data stream and a second signal based on the strobe passed in the data stream;
- an N-stage latch operatively coupled to the enable-signal circuit including a first stage latch and a second stage latch, wherein N is four or larger, and wherein the first stage latch loads every Nth word of a data stream based on the first signal, and the second stage latch loads every N+2nd word of the data stream based on the second signal;
- an unload-signal circuit that provides a third signal based on an internal bus clock and a fourth signal based on the internal bus clock; and
- a multiplexor having a data input connected to an output of the first stage latch and having another data input connected to an output of the second stage latch and a control input operatively coupled to the unload-signal circuit, wherein the multiplexor selects every Nth word from the first stage latch to a first bus based on the third signal and selects every N+2nd word from the second stage latch to the first bus as next in time to a just-prior Nth word based on the fourth signal.

17. The circuit of claim 16, wherein N is six, wherein the N-stage input-latch further includes a third stage latch, a fourth stage latch, a fifth stage latch, and a sixth stage latch, each respective stage latch controlled by a respective signal from the enable-signal circuit to load every N+1st word of the data stream into the third stage latch, every N+3rd word into the fourth stage latch, every N+4th word of the data stream into the fifth stage latch, every N+5th word of the data stream into the sixth stage latch, wherein the multiplexor is coupled to receive respective signals provided by the unload-signal circuit based on the internal bus clock to select every N+1st word from the fourth stage latch to a second bus, every N+3rd word from the third stage latch to the second bus as next in time to a just-prior N+1st word, every N+4th word from the fifth stage latch to the first bus as next in time to a just-prior N+2nd word, and every N+5th word from the sixth stage latch to the second bus as next in time to a just-prior N+3rd word.

18. A multiprocessor system that includes the circuit of claim 16, the system further comprising:
- a bus;
- one or more processors each operably coupled to the bus;
- an interface chip operably coupled to the bus; and
- a memory operably coupled to the interface chip.

19. The multiprocessor system of claim 18, wherein the interface chip is a node controller the system further comprising:
- a network operably coupled to the interface chip and to one or more other interface chips, each one of the one or more other interface chips each operably coupled to a respective bus, each respective bus operably coupled to a plurality of other processors, and each one of the one or more other interface chips further operably coupled to a respective memory.

20. The circuit of claim 16, wherein the first signal and the second signal are further based on a first stage selector, and on a data_ready signal passed in the data stream.

21. The circuit of claim 20, wherein the third signal and the fourth signal are further based on a second stage selector, and on the data_ready signal passed in the data stream.

22. A circuit for reliable capture of data words from a data stream, the circuit comprising:
- an enable-signal circuit that provides a first signal based on a strobe passed in the data stream and a second signal based on the strobe passed in the data stream;
- an N-stage latch operatively coupled to the enable-signal circuit including a first stage latch and a second stage latch, wherein N is four or larger, and wherein the first stage latch loads every Nth word of a data stream based on the first signal, and the second stage latch loads every N+2nd word of the data stream based on the second signal;
- an unload-signal circuit that provides a third signal based on an internal bus clock and a fourth signal based on the internal bus clock; and
- a multiplexor having a data input connected to an output of the first stage latch and having another data input connected to an output of the second stage latch and a control input operatively coupled to the unload-signal circuit, wherein the multiplexor selects every Nth word from the first stage latch based on the third signal and selects every N+2nd word from the second stage latch based on the fourth signal, wherein the strobe includes a pair of complementary differential strobe signals.

23. The circuit of claim 22, wherein N is six, the N-stage input-latch further including a third stage latch,
- wherein the enable-signal circuit provides a fifth signal based on the strobe passed in the data stream, and wherein the third stage latch loads every N+4th word using the fifth signal, and
- wherein the unload-signal circuit provides a sixth signal based on the internal bus clock and the multiplexor selects every N+4th word from the third stage latch based on the sixth signal.

24. The circuit of claim 23, wherein the enable-signal circuit generates a circulating set of pulses based on the strobe passed in the data stream and on a data ready signal passed in the data stream.

25. The circuit of claim 23, wherein the unload-signal circuit generates a circulating set of pulses based on the internal bus clock and on a data ready signal passed in the data stream.

26. The circuit of claim 23, wherein the strobe includes a pair of complementary differential strobe signals.

27. A method for reliable data capture from a bus, the method comprising:

provideng an N-stage FIFO including a first stage and a second stage, wherein N is two or larger;

loading every Nth word of a data stream into the first stage using a first signal based on a stage selector, and on a strobe and a data_ready signal passed in the data stream; loading every N+1st word of the data stream into the second stage latch using a second signal based on the stage selector, and on the strobe and the data_ready signal passed in the data stream;

unloading every Nth word from the first stage to a first bus using a third signal based on a local clock and the data_ready signal passed in the data stream; and unloading every N+1st word from the second stage to a second bus using a fourth signal based on the local clock and the data_ready signal passed in the data stream.

28. A computer system comprising:

a bus;

one or more processors each operably coupled to the bus;

an interface chip operably coupled to the bus;

a memory operably coupled to the interface chip; and means, within the interface chip, for reliable data capture in the presence of bus-master changeovers, wherein the means for reliable data capture in the presence of bus-master changeovers includes a load-select-enable/ unload signal-signal generator.

29. A method for reliable data capture, the method comprising:

providing an N-stage latch including a first stage latch and a second stage latch, wherein N is two or larger;

loading every Nth word of a data stream into the first stage latch using a first signal based on a strobe passed in the data stream;

loading every N+1st word of the data stream into the second stage latch using a second signal based on the strobe passed in the data stream;

unloading every Nth word from the first stage latch using a third signal based on an internal bus clock; and unloading every N+1st word from the second stage latch using a fourth signal based on the internal bus clock, wherein the strobe includes a pair of complementary differential strobe signals.

30. A method for reliable data capture, the method comprising:

providing an N-stage latch including a first stage latch and a second stage latch, wherein N is two or larger;

loading every Nth word of a data stream into the first stage latch using a first signal based on a strobe passed in the data stream;

loading every N+1st word of the data stream into the second stage latch using a second signal based on the strobe passed in the data stream;

unloading every Nth word from the first stage latch using a third signal based on an internal bus clock; and unloading every N+1st word from the second stage latch using a fourth signal based on the internal bus clock, wherein the first and second signals are based on circulating pulses based on the strobe passed in the data stream and on a data ready signal passed in the data stream.

* * * * *

UNITED STATES PATENT AND TRADEMARK OFFICE
CERTIFICATE OF CORRECTION

PATENT NO. : 6,839,856 B1
DATED : January 4, 2005
INVENTOR(S) : Fromm et al.

It is certified that error appears in the above-identified patent and that said Letters Patent is hereby corrected as shown below:

Column 16,
Lines 54-55, delete "based on" before "the".

Column 17,
Lines 17-18, delete "based on" before "the".

Signed and Sealed this

Twenty-eighth Day of June, 2005

JON W. DUDAS
*Director of the United States Patent and Trademark Office*